United States Patent [19]
McIntosh

[11] Patent Number: 5,158,106
[45] Date of Patent: Oct. 27, 1992

[54] ULTRA-LOW HEAT LEAK CRYOGENIC VALVE

[75] Inventor: Glen E. McIntosh, Boulder, Colo.

[73] Assignee: Saes Pure Gas, Inc., San Luis Obispo, Calif.

[21] Appl. No.: 711,629

[22] Filed: Jun. 6, 1991

[51] Int. Cl.$^5$ .............................................. F16L 7/00
[52] U.S. Cl. .................. 137/375; 251/335.3; 251/368; 62/50.7
[58] Field of Search ............ 251/335.1, 335.2, 335.3, 251/368; 137/375; 62/50.7

[56] References Cited

U.S. PATENT DOCUMENTS

| | | | |
|---|---|---|---|
| 3,251,575 | 5/1966 | Campbell et al. | 251/368 |
| 3,315,700 | 4/1967 | Greenwood | 251/335.3 |
| 3,383,875 | 5/1968 | Haas | 62/50.7 |
| 3,491,789 | 1/1970 | Callahan et al. | 251/335.1 |
| 3,573,863 | 4/1971 | Doors | 251/335.3 |
| 3,774,881 | 11/1973 | Gregory | 251/335.3 |
| 3,784,156 | 1/1974 | Paetzel et al. | 137/219 |
| 4,171,792 | 10/1979 | Bass | 251/335.2 |
| 4,462,422 | 7/1984 | Owoc et al. | 251/335.1 |
| 4,644,969 | 2/1987 | Watanabe | 251/335.2 |
| 5,000,215 | 3/1991 | Phillips | 251/335.3 |

Primary Examiner—A. Michael Chambers
Attorney, Agent, or Firm—Daniel C. McKown

[57] ABSTRACT

A cryogenic valve that uses conventional materials in unusual ways to achieve very low heat leak, excellent strength, pressure or vacuum integrity and modest manufacturing cost. Heat leak rates on the order of 0.5 watt have been obtained in a 1.5 inch valve. Such performance is made possible by the unique structure of the valve stem, of the bonnet extension, and of certain insulative spacers. The valve stem consists of a thin wall tube of wound glass filaments in an epoxy matrix. The bonnet extension consists of a thin wall stainless steel bellows wound with glass fibers in an epoxy matrix. The insulative spacers have a shape that results in a long tortuous conduction path when they are stacked inside the valve stem and in the space between the valve stem and the bonnet extension.

11 Claims, 4 Drawing Sheets

ULTRA-LOW HEAT LEAK CRYOGENIC VALVE

BACKGROUND OF THE INVENTION

1. Field of the Invention

The present invention is in the field of cryogenics and specifically relates to a valve for controlling the flow of cryogenic fluids. The valve uses unconventional materials in a design that results in the valve having very low heat leak, excellent strength, vacuum and pressure integrity, and modest manufacturing cost.

2. The Prior Art

In a low heat leak cryogenic valve, the manual operating handle or power operator is at room temperature. Either of these is connected to the valve sealing element or plug by a stem which is housed within a stationary sleeve called the bonnet extension. The bonnet extension is generally substantially larger in diameter than the stem in order to allow insertion and removal of the valve plug. The valve stem, bonnet extension, and annular space between them act as paths for the influx of heat. Likewise, the space within a tubular valve stem will allow heat to enter, both by radiation and by conduction.

The most common approach to reducing the influx of heat is to use conventional materials that have low thermal conductivity and to minimize the cross sectional area of the conductive path consistent with maintaining the strength of the parts.

When this traditional approach was applied by the present inventor to a 1.5 inch cryogenic valve, the heat leak was reduced from approximately 5 watts to approximately 2 watts.

Thereafter, the present inventor was faced with the need to reduce the heat leak to approximately 0.5 watt—a factor of 10 relative to the original conventional 1.5 inch valve. To solve this formidable problem, a fresh approach was needed, and the solution is the subject of this application.

SUMMARY OF THE INVENTION

Going beyond the conventional approach, the present inventor employed composite structures for the bonnet extension, and for the areas within the valve stem and between the stem and bonnet extension of a cryogenic valve. So far as is known, such composite structures have never before been used in cryogenic valves. Their use results in leak rates several times smaller than could previously be achieved.

In accordance with the present invention, the bonnet extension consists of a thin wall metal bellows covered by a composite layer consisting of glass filaments wound over the bellows and embedded in a matrix of epoxy. Not only is metal used, but strangely, it is in the form of a bellows. Nevertheless, there is a hidden rationale for the choice, which will be explained below.

In accordance with the present invention, the valve stem includes a thin wall tube consisting of wound glass filaments embedded in a matrix of epoxy. In the preferred embodiment, the wall thickness is approximately 2% of the diameter of the tube. In other embodiments the wall thickness ranges from approximately 2% to 5% of the stem tube diameter depending on the size and operating pressure of the valve. Considering that in a typical installation for a 1.5 inch valve the axial force on the valve stem may be as much as 500 pounds force plus a typical safety factor of four, the use of tubes having walls this thin and composed partly of glass does not immediately come to mind.

Finally, in accordance with the present invention, the space inside the tubular valve stem and the space between the valve stem and the bonnet extension are filled by a number of uniquely-shaped spacers. Their shape and purpose will become clear.

The combination of the new valve stem, the new bonnet extension and the spacers results in a cryogenic valve of exceptional performance. The structure of this valve will be explained in detail with the aid of a number of drawings which merely illustrate a preferred embodiment of the invention. It should be understood that the invention is in no way limited to what is shown in the drawings.

DETAILED DESCRIPTION OF THE PREFERRED EMBODIMENT

Figure 1:
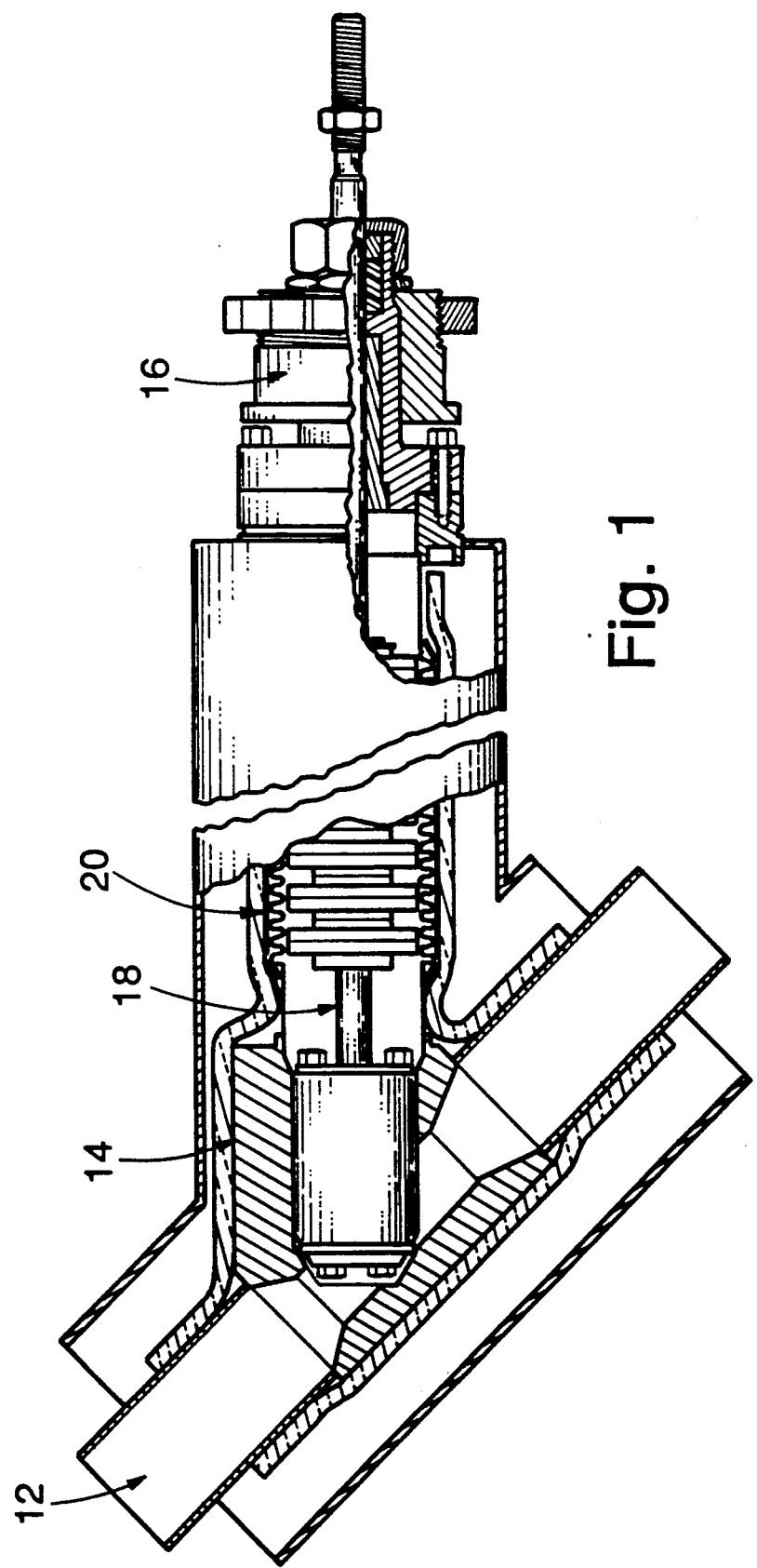
FIG. 1 is a fractional side elevational view partly in cross section showing the entire valve in a preferred embodiment.

FIGS. 1 through 4 all relate to the same preferred embodiment, and like parts will be denoted by the same reference numeral in all the drawings. For purposes of illustration, the valve shown is of a type that is operated by an actuator that is not shown in the drawings.

FIG. 1 shows the valve of the preferred embodiment assembled. The valve is used to control the flow of a cryogenic fluid through the passage 12. The valve body 14 is composed of stainless steel and is of conventional design. Likewise, the bonnet assembly 16 is of conventional design.

The present invention involves improvements to the valve stem assembly 18, to the bonnet extension 20, and to spaces inside of and around the valve stem.

Figure 2:
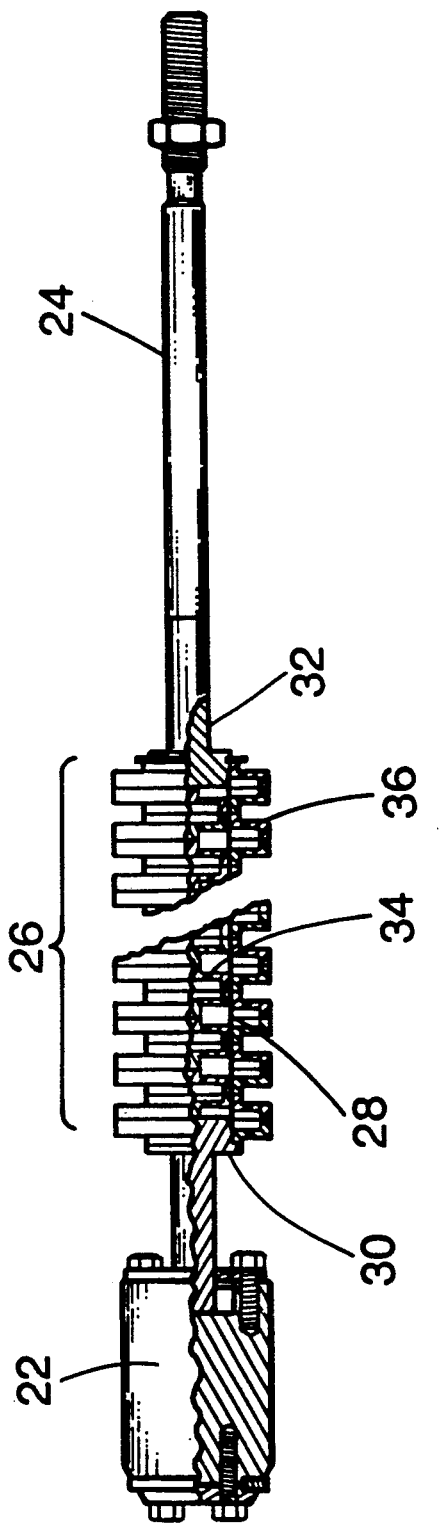
FIG. 2 is a fractional side elevational view partly in cross section showing the valve stem assembly in the preferred embodiment.
Figure 3:
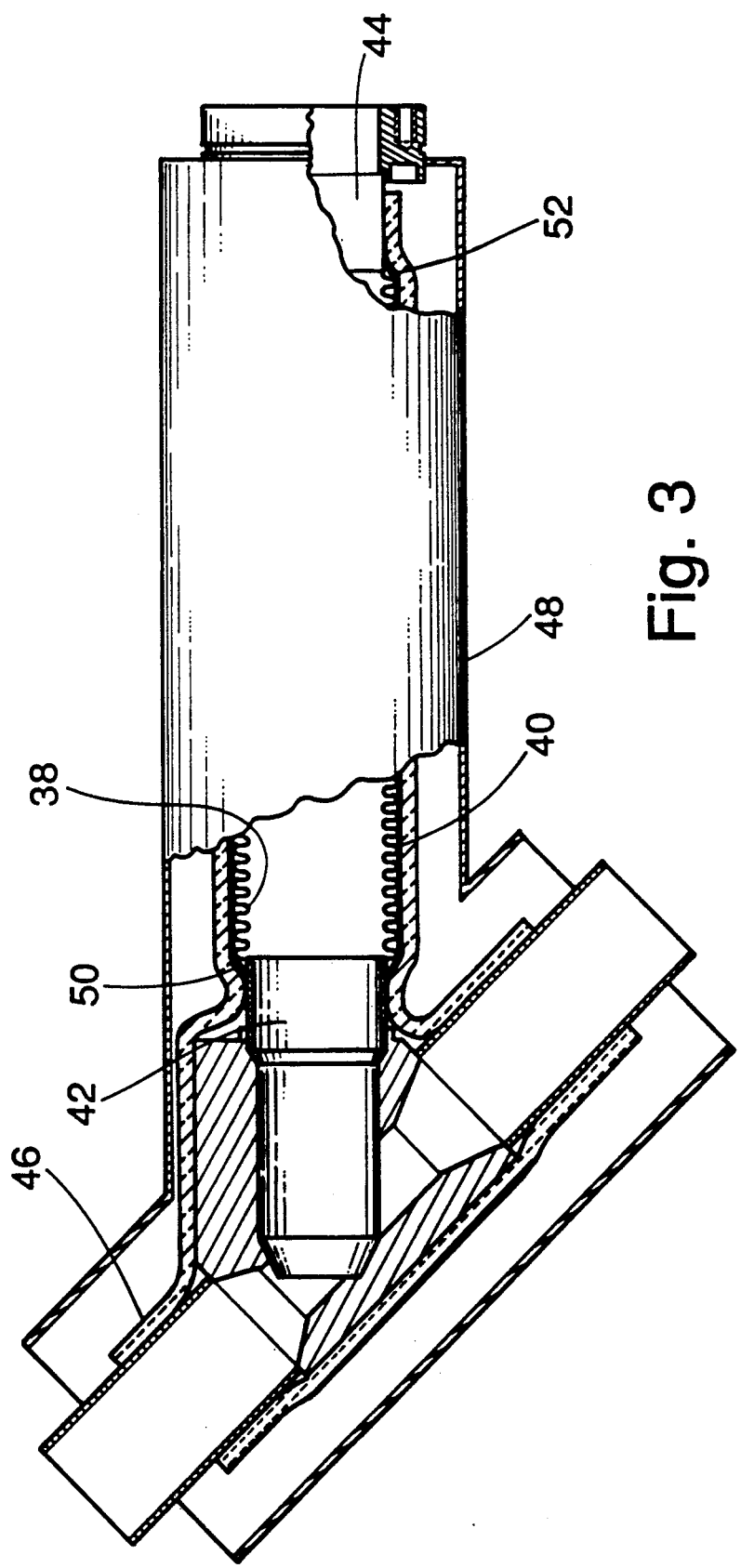
FIG. 3 is a side elevational view partly in cross section showing the valve body and bonnet extension in the preferred embodiment of the invention; and, FIG. 4 is a diagram drawn to a different scale from the used in FIGS. 1-3 and showing a fractional cross sectional elevational view of the valve stem assembly and the bonnet extension of the preferred embodiment.

FIGS. 2 and 3 show the valve of FIG. 1 partly disassembled so as better to show the valve stem assembly 18 (in FIG. 2) and the bonnet extension 20 (in FIG. 3).

In use, the cryogenic fluid in the passage 12 is extremely cold, perhaps only a few degrees above absolute zero, while the bonnet assembly 16 is at room temperature. In a conventional valve, this extraordinary thermal gradient would cause rapid influx of heat, which is undesirable for various reasons depending on the circumstances.

In the valve stem assembly shown in FIG. 2, the plug 22 is at a very low temperature, while the actuator rod 24 may be at room temperature. Rampant flow of heat from the actuator rod 24 to the plug 22 is prevented by interposing the thermal barrier section 26, which extends approximately the entire length of the bonnet extension 20.

Figure 4:
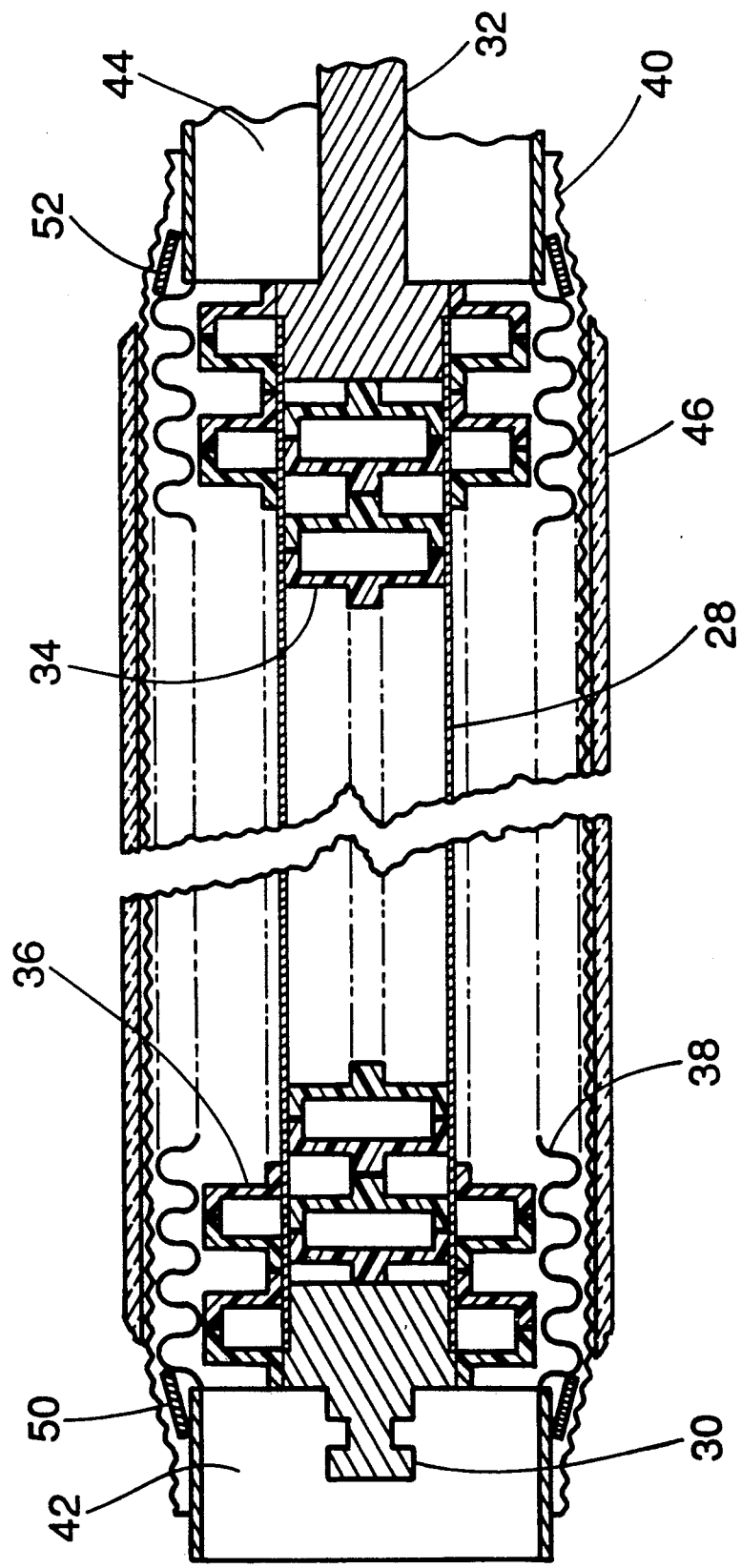

As best seen in FIG. 4, the thermal barrier portion includes a thin wall hollow tube 28 composed of filament wound S-2 glass in an epoxy matrix. The outside diameter of the tube 28 is 1 inch, and the wall thickness is approximately 0.020 inch depending on the required operating pressure. The composite material of which the tube 28 is formed has a very low heat leak because its thermal conductivity is low at room temperature and falls by nearly a factor of eight as its temperature is reduced to that of liquid helium at about 4 degrees Kelvin. High strength of the composite also contributes to low heat leak by virtue of the extremely small cross sectional area (0.062 square inch) required to react valve stem forces. The tube 28 can be attached to the end pieces 30 and 32 by bonding or by winding the filament onto tapered surfaces which lock in the fibers. A satisfactory bonding agent for this use is available from the Emerson-Cumming Company under the nomenclature 2850-FT Stycast Epoxy. The hollow shape of the tube 28 provides adequate column strength in compression with minimum cross sectional area for conductive heat transfer. Surprisingly, when made as described, the tube 28 can support a compressive force greater than 2,000 pounds.

A number of insulative spacers, of which the spacer 34 is typical, are stacked inside the tube 28. These spacers are not bonded to the tube 28, to the end pieces 30, 32, or to each other. Their purpose is to provide a tortuous heat conduction path, multiple conduction-resisting contacts, and complete blockage of axial thermal radiation. In the preferred embodiments, these spacers are composed of TEFLON. TEFLON is a registered trademark of duPont for polytetrafluoroethylene. As can be seen most clearly in FIG. 4, in the preferred embodiment each spacer includes a disk-like portion with a flange extending axially from its periphery in a first axial direction, and a small cylinder projecting in the opposite axial direction.

An additional stack of spacers of which the spacer 36 is typical surrounds the tube 28 in the preferred embodiment. These also are made of TEFLON and are not bonded together. As best seen in FIG. 4, each of the spacers 36 includes an annular central portion with a flange extending in a first axial direction from its periphery and with a hub extending in the opposite axial direction at the central aperture of the annular portion. The spacers 36 serve the same purposes as the spacers 34.

In alternative embodiments, the spacers 34 and 36 are made of any low thermal conductivity material that is opaque to thermal radiation. In addition to TEFLON (polytetrafluoroethylene), KEL-F (polychlorotrifluoroethylene), and Vespel (poly-N,N'-(p,p'-oxydiphenylene) pryomellitimide) can also be used.

In terms of preventing heat leakage, the most significant improvement of the present invention is in the bonnet extension 20 which will now be described in relation to FIGS. 3 and 4.

In accordance with the present invention, the bonnet extension includes a thin wall stainless steel bellows 38, an over-wrap 40 of fiber filaments and epoxy, and end pieces 42 and 44, which are welded respectively to the valve body 14 and to the bonnet assembly 16. The bonnet extension thus formed is then surrounded by a comparatively thick layer 46 of an insulative material, typically multilayer insulation consisting of alternate layers of material highly reflective to thermal radiation separated by layers of very low thermal conductivity material, which is then enclosed within a vacuum jacket 48. The end of the jacket 48 nearest the valve body is normally joined to a housing that encloses the valve body and the passage 12.

The thickness of the stainless steel bellows 38 is 0.006 inch in the preferred embodiment. In alternative embodiments, intended for higher pressure applications, the thickness may be as great as 0.020 inch. The bellows is effective in reducing heat leak because the convolutions present a path length in the axial direction that is at least twice the length of the bellows.

The use of the metal bellows renders the bonnet extension leak proof, since the bellows, being suitable for vacuum use, has high integrity. In addition, the bellows can be joined to the end pieces 42, 44 by welding; this technology is highly developed.

By itself, the bellows lacks axial stiffness and has limited ability to withstand internal pressure. These deficiencies can easily be compensated by wrapping the bellows with a roving consisting of a number of glass filaments coated with an epoxy.

In the preferred embodiment, the filaments are wound over the bellows at a 45 degree angle to the axis but this angle may vary from 30 to 60 degrees depending on the size of the valve and its operating pressure. Also, in the preferred embodiment, the filaments are composed of S-2 glass. The roving is commercially available from Fiberite of Tempe, Arizona, under catalog numbers 91A through 91D. The windings do not extend into the corrugations of the bellows, but instead span them, thereby conforming to the envelope of the bellows rather than following its shape in detail.

In alternative embodiments the filament used for winding the over-wrap 40 and the tube 28 may be composed of any high strength low thermal conductivity material, including without limitation Kevlar, alumina, boron, carbon, quartz, and glass.

The filament over-wrap 40 provides axial restraint and radial stability for the bellows 38. In the preferred embodiment, the over-warp 40 is approximately 0.025 inch thick. By choosing the winding angle and thickness of the over-wrap layer, the bonnet extension can be made as strong as needed while still contributing only a small heat leak.

Heavier stainless steel end pieces 42, 44 are welded to the ends of the bellows to provide for secure attachment of the bonnet extension. Tapered rings 50, 52 welded to the end pieces 42, 44 respectively provide rigid terminations for the filament windings, and permit the windings to be installed without imposing a compressive load on the end corrugations of the bellows. When the filament winding is complete and has been cured, it will bear all of the axial load on the bonnet extension, and will stabilize the bellows so that the assembly can withstand the maximum operating pressure of the valve, which might range from 10 to 50, typically 20, times atmospheric pressure.

Thus, the design philosophy of the bonnet extension 20 is that the bellows provides a leak tight sealing element that can be welded to the remaining stainless steel parts and because of its convoluted shape and thin wall minimizes heat conduction. The filament winding/epoxy layer provides axial stiffness and stabilizes the bellows.

Thus, there has been described a vale for cryogenic use that has extremely low heat leak, which is made made possible by three innovative structural features: a valve stem thermal barrier composed entirely of filament wound glass epoxy, a bonnet extension including a bellows that is wound with glass filaments embedded in an epoxy matrix, and a packing consisting of a stack of insulative spacers. Acting in concert, these structural innovations result in a cryogenic valve that has unprecedented low heat leak, for example, 0.5 watt for a 1.5 inch valve.

For exceptionally low heat leak to very low temperature cryogens, particularly helium, hydrogen, and neon, the bonnet extension and valve stem can be divided into two tandem elements with rigid metal connectors between them. The metal cylinder between the two bonnet extension elements is then cooled by intimate contact with boiling liquid nitrogen at about 78 degrees Kelvin. This technique, called "heat stationing," sacrifices liquid nitrogen to reduce the thermal gradient down to the valve's working fluid. It also permits taking advantage of the much lower thermal conductivity values of stainless steel and composite materials at average temperatures below 78 degrees Kelvin. By appropriate selection of the element lengths above and below the Kelvin. By appropriate selection of the element lengths above and below the "heat station," bonnet extension heat leak to the valve working fluid can be reduced by about a factor of five over the already low value.

Heat stationing the valve stem is less effective than heat stationing the bonnet extension because it is difficult to achieve good thermal contact with liquid nitrogen inside the bonnet. However, flexible contacts of high conductivity material can be used to gain a degree of heat stationing. The overall result of careful heat stationing is to reduce valve heat leak by a factor of from four to five.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. A bonnet extension that is leak-tight, that can support large axial and radial loads, and that minimizes heat transfer into a valve, comprising:
   a metallic bellows having a corrugated outer surface;
   a composite layer covering the corrugated outer surface of said metallic bellows and composed of high strength low thermal conductivity wound filaments embedded in an epoxy matrix.

2. The bonnet extension of claim 1 wherein said wound filaments are composed of a material selected from the group consisting of Kevlar, alumina, boron, carbon, quartz and glass.

3. The bonnet extension of claim 1 wherein said high strength low thermal conductivity wound filaments are composed of S-2 glass.

4. A stem for a low heat leak cryogenic valve comprising: a thin wall tube composed of high strength low thermal conductivity wound filaments in an epoxy matrix.

5. The stem of claim 4 wherein said wound filaments are composed of a material selected from the group consisting of Kevlar, alumina, boron, carbon, quartz and glass.

6. The stem of claim 4 wherein said high strength low thermal conductivity wound filaments are composed of S-2 glass.

7. The stem of claim 4, wherein the wall thickness of said thin wall tube is less than 5% of its diameter.

8. A thermally insulative spacer comprising:
   a unitary body of a low thermal conductivity material that is opaque to thermal radiation in the form of a figure of revolution about an axis and including
   an annular portion oriented perpendicular to the axis and having a central aperture;
   a flange extending in a first axial direction from the periphery of said annular portion; and,
   a hub extending in a second axial direction from the central aperture of said annular portion.

9. The thermally insulative spacer of claim 8 wherein said low thermal conductivity material that is opaque to thermal radiation is a polymer selected from the group consisting of polytetrafluoroethylene, polychlorotrifluoroethylene, and poly-N-N'-(p,p'-oxydiphenylene) pryomellitimide.

10. A thermally insulative spacer comprising:
    a unitary body of a low thermal conductivity material that is opaque to thermal radiation in the form of a figure of revolution about an axis and including
    a disk oriented perpendicular to the axis;
    a flange extending in a first axial direction from the periphery of said disk; and,
    a cylinder extending in a second axial direction from said disk and smaller in diameter than said disk.

11. The thermally insulative spacer of claim 10 wherein said low thermal conductivity material that is opaque to thermal radiation is a polymer selected from the group consisting of polytetrafluoroethylene, polychlorotrifluoroethylene, and poly-N,N'-(p,p'-oxydiphenylene) pryomellitimide.

* * * * *